April 23, 1929.  C. H. VEEDER  1,710,248

VALVE

Filed Aug. 1, 1927

INVENTOR
Curtis Hursey Veeder
BY
Redding, Greeley, O'Shea Campbell
ATTORNEYS

Patented Apr. 23, 1929.

1,710,248

UNITED STATES PATENT OFFICE.

CURTIS HUSSEY VEEDER, OF HARTFORD, CONNECTICUT.

VALVE.

Application filed August 1, 1927. Serial No. 209,651.

This invention relates to plug valves of the character of that shown in Letters Patent of the United States, No. 1,604,428, dated October 26, 1926. Generally stated, the object of the invention is to provide a valve of the character of that shown in which the valve plug shall be pressed closely into its seat, in which the valve shall be so packed as to prevent the possibility of leakage even in long use without requiring the application of ordinary packing glands in which the power required to turn the valve is reduced to a minimum through a reduction of frictional resistance, and in which the valve plug shall be so related to the operating stem and handle that it shall be properly centered and not liable to be unseated by ordinary manipulation.

Figure 1:
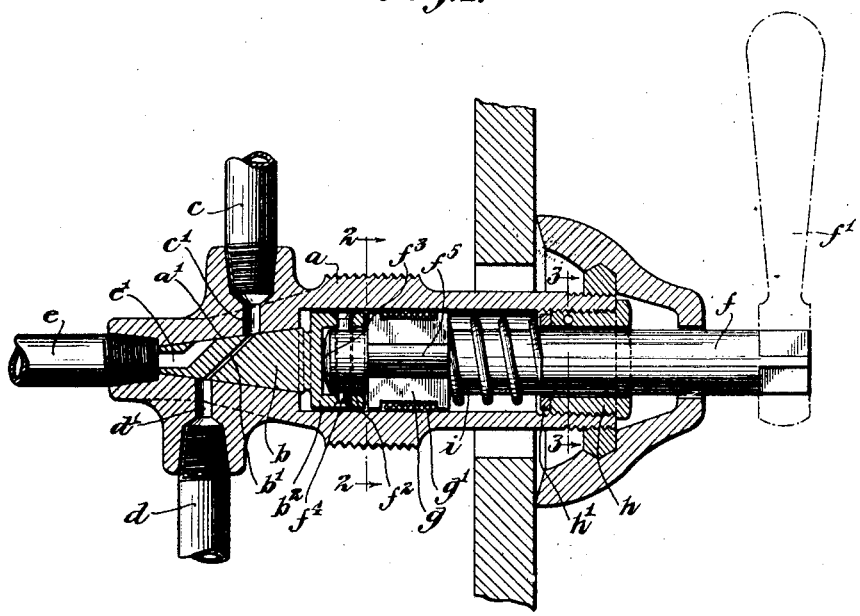

The invention will be more fully explained hereinafter with reference to the accompanying drawings in which it is illustrated and in which:

Figure 1 is a view in longitudinal sectional elevation of a valve which is constructed in accordance with the invention.

Figure 2:
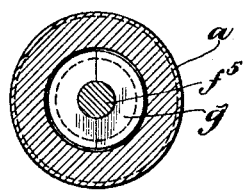
Figure 3:
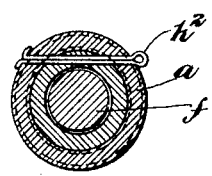

Figures 2 and 3 are detail views in transverse section on the planes indicated by the broken lines 2—2 and 3—3 respectively of Figure 1.

The body $a$ of the valve is formed with a conical seat $a'$ to receive the correspondingly formed valve plug $b$. The valve is so constructed as to permit at will the delivery of water or other liquid from a source of supply to a place where, for example, the pressure of the supply may be utilized, and the relief of the pressure at the place of use. Accordingly the body $a$ is adapted for the connection of a supply pipe $c$ with a corresponding port $c'$, a discharge pipe $d$ with a corresponding port $d'$, and an exhaust pipe $e$ with a corresponding port. The valve plug $b$ is likewise provided with a passage $b'$, through which the supply port $c'$ may be placed in communication with the pipe $d$ through which the water is to be conducted to the place where the pressure of the supply may be utilized, and with a passage $e'$ for communication between pipes $d$ and $e$. The plug $b$, as will be observed, is a tapered plug and fits with a proper working fit in the correspondingly tapered seat $a'$ in the body $a$. Although it is of small diameter in order to reduce friction as much as possible and therefore to reduce the power required to turn the valve, it nevertheless has large surface area around its openings, thereby offering long distances from one opening to another and reducing leakage.

Under the conditions of the particular use for which this valve has been designed, that is to say, the operation of waste valves of bathtubs, etc., it is necessary that the valve plug $b$ shall be truly centered in its seat, and shall be pressed into its seat with a suitable, yielding force, and that leakage past the stem of the valve shall be prevented at all times, without making the valve difficult of operation. In the construction of these valves, it has been found that it is difficult to make the tapered seat in the body exactly concentric with the retaining nut through which the valve stem passes at the outer end of the body especially when the valve stem is integral with the plug and also that any side pressure on the operating handle had a tendency to prevent perfect seating of the plug in the body. Accordingly the operating stem $f$, to which the operating handle $f'$ is applied, is made separate from the plug $b$ and is connected therewith through a loose or wabble joint. This joint may be constructed as shown in the drawing, in which the plug is cupped, as indicated at $b^2$, to receive the relatively large head $f^2$ of the stem $f$, the head being rounded as at $f^3$ to bear against the bottom of the cup. A pin $f^4$ which passes loosely through the head $f^2$ enlarged for this purpose, serves to connect the plug with the operating stem for rotation. As an effective means of sealing the plug $b$ and transmitting pressure thereto and of supporting the reduced valve stem against distortion, a split spool $g$ is applied to a reduced portion $f^5$ of the operating stem $f$ and receives externally a winding of fine copper wire, as at $g'$. This bushing is made of special anti-friction metal and serves to take the thrust of the hereinafter mentioned spring. Preferably, the valve stem is formed with a reduced portion to receive the spool, in order that friction may be reduced for the purpose of making easy the operation of the valve.

Between the split sleeve $g$ and the gland nut $h$ threaded into the outer end of the body $a$ is placed a spiral spring $i$ which, acting through the split sleeve $g$, the shouldered stem $f$ and the head $f^2$, presses the plug $b$ into its seat with the desired degree of pressure. The stem $f$ has a free fit within the gland nut $h$ and the pressure of the spring $i$ may be regulated as desired by rotation of the nut $h$ or the interposition of the washer or washers $h'$ between the nut and the spring. As shown, the nut may be locked in adjusted position by a pin $h^2$. It will be noted that the function of the spool or collar $g$ is to transmit the pressure of the spring $i$ to the head $f^2$ of the valve stem and through that to the valve plug to press it closely into its seat.

It will be observed that by the construction described the plug is held always in its seat with a yielding pressure, that the plug may always be centered in its seat without regard to the operating stem, and that side pressure on the operating handle cannot affect the seating of the plug.

I claim as my invention:

1. In a plug valve, the combination of a body having a tapered seat and suitable ports, a tapered plug having passages for cooperation with the ports, a valve stem operatively associated with the plug and having a reduced portion and an enlarged head, a spool applied to the reduced portion of the valve stem to transmit pressure to the head of the stem and through it to the valve plug, a spring to exert pressure against the spool, and an abutment for the spring.

2. In a plug valve, the combination of a body having a tapered seat and suitable ports, a tapered plug having passages for cooperation with the ports and having a cupped end, a valve stem having a reduced portion and an enlarged head to enter the cup, a pin passed loosely through the head and engaging the wall of the cupped portion of the plug, a spool applied to the reduced portion of the valve stem to transmit pressure to the head of the stem and through it to the valve plug, a spring to exert pressure against the spool, and an abutment for the spring.

3. In a plug valve, the combination of a body having a tapered seat and suitable ports, a tapered plug having passages for cooperation with the ports, a valve stem operatively associated with the plug and having a reduced portion and an enlarged head, a spool applied to the reduced portion of the valve stem to transmit pressure to the head of the stem and through it to the valve plug, the spool being split and wound externally, a spring to exert pressure against the spool, and an abutment for the spring.

This specification signed this 18th day of July, A. D. 1927.

CURTIS HUSSEY VEEDER.